May 24, 1932.  H. M. JACOBS  1,860,185
COMPUTING MECHANISM
Filed Aug. 11, 1928   2 Sheets-Sheet 1

INVENTOR.
Harry M. Jacobs
BY Duell, Dunn & Anderson
ATTORNEYS.

May 24, 1932. H. M. JACOBS 1,860,185
COMPUTING MECHANISM
Filed Aug. 11, 1928   2 Sheets-Sheet 2
Fig. 4.
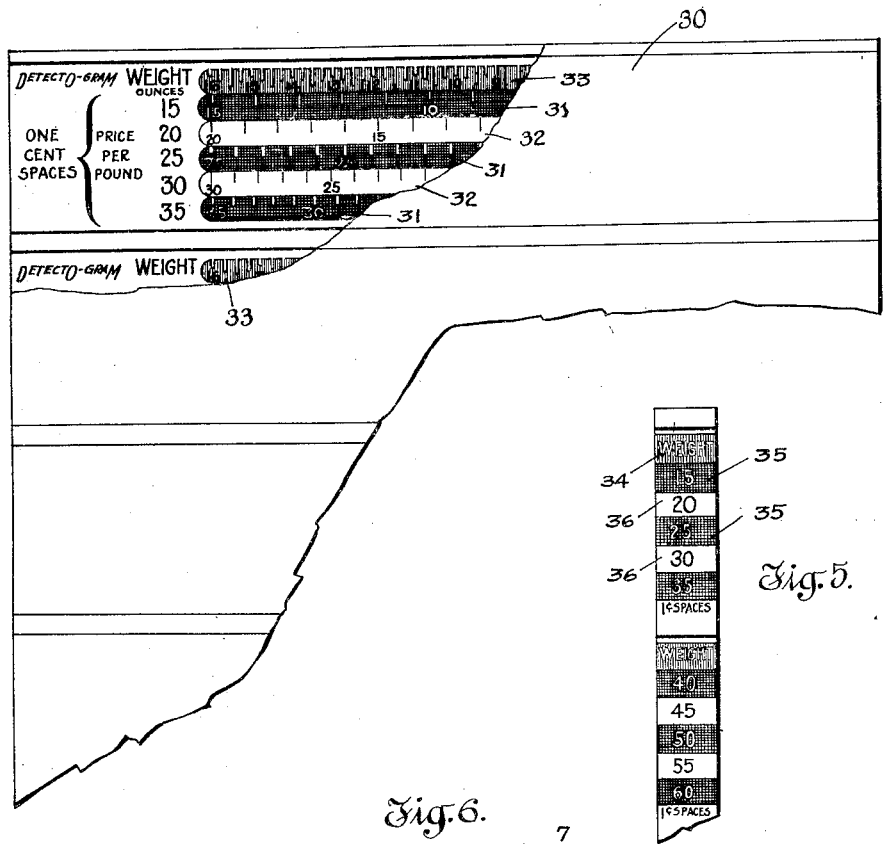
Fig. 5.
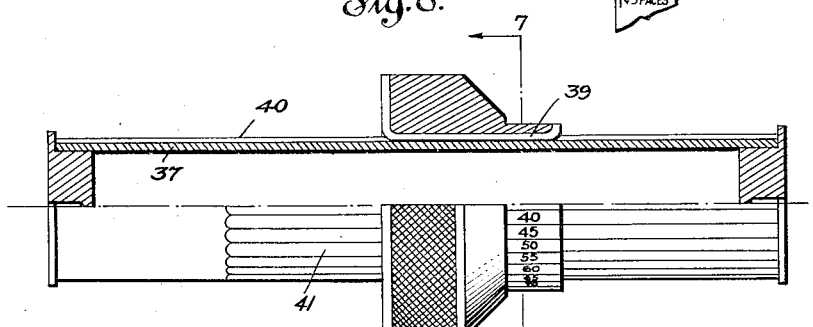
Fig. 6.
Fig. 7.
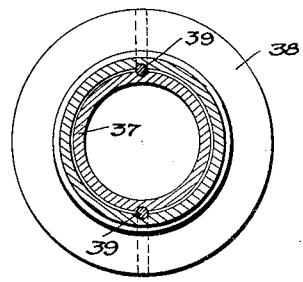
Inventor.
HARRY M. JACOBS,
By Duell, Dunn & Anderson.
Attorneys.

Patented May 24, 1932

1,860,185

UNITED STATES PATENT OFFICE

HARRY M. JACOBS, OF BROOKLYN, NEW YORK, ASSIGNOR TO THE JACOBS BROS. CO., INC., OF BROOKLYN, NEW YORK, A CORPORATION OF NEW YORK

COMPUTING MECHANISM

Application filed August 11, 1928. Serial No. 298,919.

This invention relates to scales and computing arrangements therefor.

It is an object of the invention to provide a device of this character, the parts of which will be relatively few in number and individually simple and rugged in construction, these parts being capable of assemblage to provide an article operating over long periods of time with freedom from mechanical difficulty, and which may be actuated by an unskilled person in order to furnish instantly information which would otherwise have to be carefully computed.

A further object of the invention is that of furnishing a computing registering mechanism in which preferably a poise weight will form a part of the same.

Another object of the invention is that of constructing a mechanism of this type, preferably combined with a scale of the over and under weight type, and in which the construction of both will be such that they will combine to produce a finished scale of marked utility.

With these and further objects in mind, reference is had to the attached sheet of drawings illustrating practical embodiments of the invention, and in which:

Figs. 4 and 5 are face views of the chart portions which form a part of the foregoing structure;

Fig. 6 is a view corresponding to Fig. 2 but showing a slightly different form of beam and poise; and Fig. 7 corresponds to Fig. 3 and is taken along the lines 7—7 and in the direction of the arrows of Fig. 6.

Figure 1:
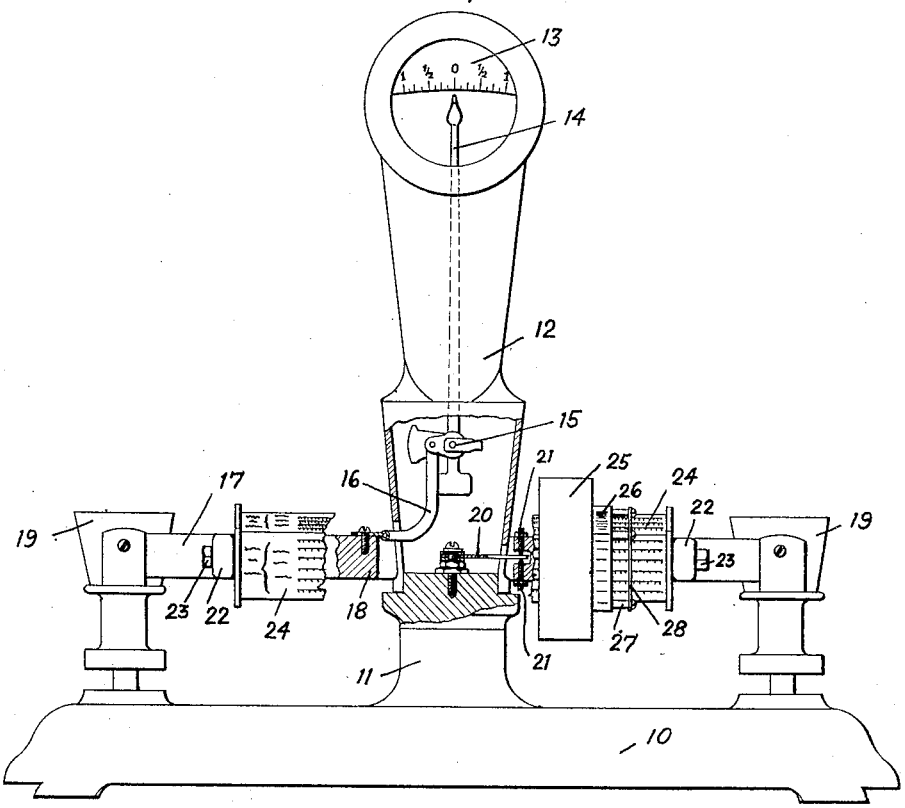
Fig. 1 is a partly fragmentary sectional face view of a scale embodying the improved construction of the present invention.

With primary reference to Fig. 1, a type of scale is illustrated in combination with which the registering and computing mechanism of the present invention is primarily intended to be utilized. In this view the numeral 10 indicates a scale base from which a post 11 extends centrally, this post supporting a housing 12 having at its upper end, for example, a dial 13, the indicia of which is traversed by a pointer 14 rockingly mounted within the housing, as at 15, and connected, for example, by a link 16 to the scale beam 17. The supports of the latter have not been shown. Suffice it to say that the beam may conveniently have a collar portion 18 encircling the housing 12 and be provided with fulcrums which bear in supports carried by a yoke associated with the post 11 or another portion of the base.

Any desired types of pans (not shown) are associated with the supports 19 carried by the ends of the beam 17 and the latter, together with the registering mechanism, is normally maintained in neutral position, as, for example, by associating with the post 11 one end of a flexion strip 20 the opposite end of which bears slidably against the reduced ends of a pair of opposed pins 21 adjustably mounted by the beam and bearing against the opposite faces of such strip.

Figure 2:
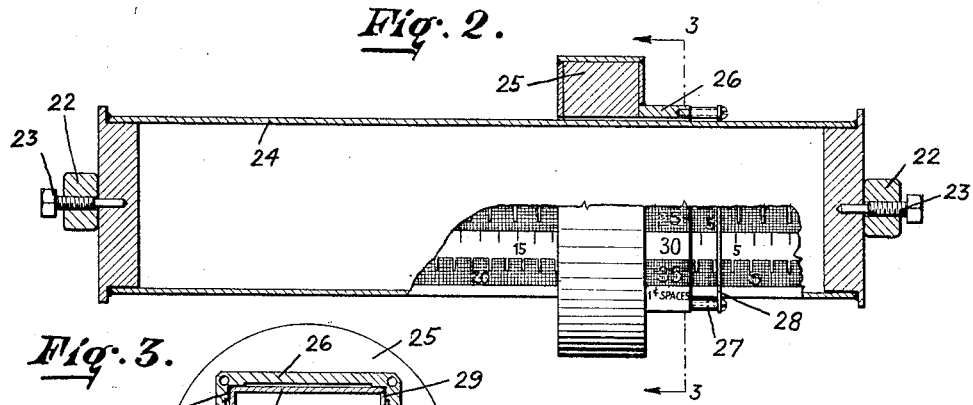
Fig. 2 is a similar but enlarged view of the computing and poise mechanism.
Figure 3:
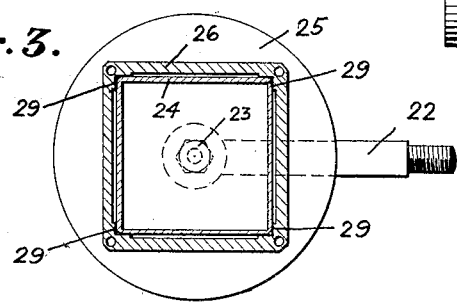
Fig. 3 is a transverse sectional view taken along the line 3—3 and in the direction of the arrows of Fig. 2.

Now with a view to providing a poise, the value of which may be varied, and which poise, furthermore, will form a part of a computing mechanism, it will be observed, as in Figs. 1 to 3, that bracket arms 22 extend outwardly from the beam and carry studs 23 between which there is rotatably supported a casing 24 which may conveniently be square in cross-section, and which carries upon its several faces indicia hereinafter referred to in detail.

Mounted slidably upon the casing is a poise weight including, in the present instance, a body 25 from which a flange portion 26 extends, the latter mounting, by means of a series of posts 27, a series of indicating wires or rods 28 which, as the poise moves along the casing, traverses the indicia upon the several faces thereof. The value of the weight provided by the poise body is accurately predetermined and the parts are so adjusted according to the present exemplification that with the poise at the extreme right position the beam will be in even balanced condition, which fact will be registered by the mechanism provided for this purpose in association with the housing 12. At this time it will, furthermore, be noted that according to the present invention it is preferred to have the poise body bear against the casing only at points immediately adjacent the corners of this casing. This has been indicated at 29, at which it will be noted that the bore of the poise body is reduced adjacent these corners. Thus friction and the probability of binding between the parts will be reduced to a minimum, aside from the fact that the indicia—hereinafter described—is preferably arranged wholly beyond these inwardly projecting portions of the poise so that the surface of the former will not be marred.

Now referring to such indicia, it will be noted, as in Fig. 4, that a plate 30 having sections corresponding in number to the faces of the casing 24 is employed and upon each face of which plate a series of tabulations 31 and 32 are arranged, these tabulations being in different contrasting colors, as for example black and white. Furthermore, a scale 33 is provided upon each face of the plate and preferably adjacent the upper edge of the same, and this scale is conveniently of still another contrasting color, as for example red, in that it indicates, in the present instance, ounces while the first tabulations indicate price. The marginal portion 26 of the poise carries upon each face indicia, as for example in Fig. 5, in which it will be noted that one subdivision 34 preferably shows the words "weight" and "ounces" and which subdivision is conveniently colored to correspond to the coloring of the scale 33 so that no confusion will result. Likewise, below this subdivision further sections 35 and 36 are provided, each having numbers indicating different values, and which sections register with the series of tabulations 31—32. The sections 35—36 are also preferably imprinted or otherwise colored to be contrasted, and such contrasting is preferably similar to the contrast colors utilized in connection with the tabulations 31—32.

Thus, in use it will be understood, presuming that an operator desires first to dispense a certain amount of produce, for example 13½ ounces, the produce will be placed in the pan (not shown) whereupon the poise will be moved to a point at which the indicating mark thereof registers with the proper graduation of the scale 33. Upon the scale reaching an even balanced condition—by the addition and/or subtraction of produce from the pan—this fact will be registered by the indicating mechanism 13—14. The operator, now presuming the produce to be worth thirty-five cents per pound, may, by simply viewing the graduation of the proper tabulation 31 which will underlie the wire or rod 28, see that the value of the produce being dispensed is thirty cents.

Conversely, in the event that it is desired simply to dispense twenty cents worth of produce which is sold at twenty-five cents per pound, the poise may be shifted until the wire, rod or other indicating element thereof registers with the 25 mark of the tabulation 32, as shown in Fig. 4, and upon the scale parts reaching an even balanced condition the operator will know that the proper amount of produce has been dispensed. Obviously, due to the fact that a multiplicity of faces are presented as part of the casing and indicating flange of the poise, it is entirely practicable to have the computing provision cover a wide range and the several faces of the mechanism will be instantly available to the operator by simply turning the casing 24.

In Figs. 6 and 7 a casing 37 has been shown which is circular in cross-section, and a poise weight 38 is mounted upon the casing by convenient association of rails 39 with such poise, which rails ride within grooves 40, providing track portions and forming a part of the casing. Thus, the poise upon being shifted longitudinally of the casing will not contact with the indicia 41 thereon, which indicia, while not shown in detail, may obviously correspond to the indicia 31 to 33; the subdivisions on the indicating flange 42 likewise corresponding to those shown in Fig. 5. The use of a computing mechanism of this character will obviously be the same as that aforedescribed.

From the foregoing it will be appreciated that, among others, the several objects of the invention specifically afore referred to have been achieved. It is intended, however, that numerous changes in construction, and rearrangement of the parts, might be resorted to without departing from the spirit of the invention as described in the following claims.

Having described my invention, what I claim as new and desire to secure by Letters Patent is:

1. In a scale, a computing mechanism including a beam member bearing indicia comprising a series of tabulations arranged according to value per unit of weight, and a poise movable longitudinally of said member and being provided with indicia for cooperation with said first named indicia, the adjacent series of indicia being of contrasting colors.

2. In a scale, a computing mechanism including a beam member bearing indicia comprising a series of tabulations arranged according to value per unit of weight, and a poise movable longitudinally of said member and being provided with indicia for cooperation with said first named indicia, and said member and poise bearing additional indicia and providing a registering mechanism indicative of the weight value of the poise in different positions along said member, said first named indicia being arranged in a series of contrasting colors and said last named indicia being disposed in a further color contrasting from the series of first named indicia.

3. In a scale, a computing mechanism including a beam member bearing indicia comprising a series of tabulations arranged according to value per unit of weight, and a poise movable longitudinally of said member and being provided with indicia for cooperation with said first named indicia, and an indicating element carried by said poise to be moved therewith, said indicating element registering with the indicia on said member and being spaced from said poise.

4. In combination, a scale of the over- and under-weight type including a rockingly mounted beam, means tending to normally maintain said beam in an even balanced condition, means for registering deflections of said beam from such balanced condition, a computing beam associated with said first named beam and to move with the same, said computing beam carrying indicia representative of different commodity price ranges, and a poise slidable along said computing beam and bearing further indicia for cooperation with said first named indicia, the adjacent series of indicia on said poise and beam being of contrasting colors.

In testimony whereof I affix my signature.

HARRY M. JACOBS.